United States Patent

[11] 3,548,111

[72] Inventors Erberto Kleissl;
Pasquale Postorino, Milano, Italy
[21] Appl. No. 769,490
[22] Filed Oct. 22, 1968
[45] Patented Dec. 15, 1970
[73] Assignee Societa Italiana Telecomunicazioni Siemens S.p.A.
Piazzale Zavattari, Milano, Italy
a corporation of Italy
[32] Priority Oct. 23, 1967
[33] Italy
[31] No. 21,892A/67

[54] IMPEDANCE-MATCHING ARRANGEMENT FOR TELEPHONE CIRCUIT
7 Claims, 20 Drawing Figs.

[52] U.S. Cl. .......... 179/81
[51] Int. Cl. .......... H04m 1/58
[50] Field of Search .......... 179/81, 81A; 333/26, 30

[56] References Cited
UNITED STATES PATENTS

| | | | |
|---|---|---|---|
| 3,350,510 | 10/1967 | Knauer et al. | 179/81(A) |
| 3,404,238 | 10/1968 | Dal Monte et al. | 179/81(A) |
| 3,441,684 | 4/1969 | McLeod | 179/81(A) |

*Primary Examiner*—Kathleen H. Claffy
*Assistant Examiner*—William A. Helvestine
*Attorney*—Karl F. Ross

ABSTRACT: Telephone system wherein a coupling circuit including a hybrid coil connects a receiver and a transmitter in conjugate relationship between a two-wire subscriber line and a balancing network, a predominantly capacitive shunt being bridged across the coupling network or across all or part of its hybrid coil to assimilate the impedance of the coupling circuit to that of the subscriber line at least in the upper region of a band of voice frequencies to be transmitted over the line.

Erberto Kleissl
Pasquale Postorino
INVENTORS.

BY

Karl F. Ross
Attorney

Erberto Kleissl
Pasquale Postorino
INVENTORS.
BY
Karl F. Ross
Attorney

Erberto Kleissl
Pasquale Postorino
INVENTORS.
BY
Karl F. Ross
Attorney

Erberto Kleissl
Pasquale Postorino
INVENTORS.

BY

Karl F. Ross
Attorney

Erberto Kleissl
Pasquale Postorino
INVENTORS.

BY

Karl G. Ross
Attorney

Erberto Kleissl
Pasquale Postorino
INVENTORS.
BY
Karl F. Ross
Attorney

Erberto Kleissl
Pasquale Postorino
INVENTORS.

BY

Karl F. Ross
Attorney

Erberto Kleissl
Pasquale Postorino
INVENTORS.
BY
Karl G. Ross
Attorney

Erberto Kleissl
Pasquale Postorino
INVENTORS.
BY
Karl G. Ross
Attorney

Erberto Kleissl
Pasquale Postorino
INVENTORS.

BY

Karl F. Ross
Attorney

IMPEDANCE-MATCHING ARRANGEMENT FOR TELEPHONE CIRCUIT

Our present invention relates to a telephone system wherein a two-wire line extends from a central office to a subscriber station which has a voice-frequency transmitter, i.e. a mouthpiece, and a voice-frequency receiver, i.e. an earpiece, connected in conjugate relationship between the line and an associated balancing network via the usual hybrid-coil transformer.

For the well-known reasons of minimizing reflections and improving the efficiency of the system, it is desirable to terminate the subscriber line at its remote end (as seen from the central office) with a coupling circuit whose impedance matches the line impedance. In practice, however, this desideratum is difficult to achieve within an extended band of voice frequencies to be transmitted over the line, generally a band of several kHz, in which the resistive component of the circuit impedance increases slowly with frequency whereas the reactive component slowly decreases while remaining inductive in character, i.e. of positive sign; the line impedance, on the other hand, has a capacitive, i.e. negative, reactive component which decreases in absolute value with increasing frequency, this absolute value being substantially equal to that of the line resistance. With short subscriber lines, on the order of 100 meters or less, the line impedance is negligible compared to the impedance of the coupling circuit; with long lines, upward of about 2 kilometers, the line impedance predominates. Thus, as seen from the central office, the impedance of the subscriber channel varies greatly with the length of the line.

The general object of our present invention, therefore, is to provide simple means for assimilating the impedance of the coupling circuit, as seen from the central office, to that of the associated subscriber line particularly in the upper region of the voice-frequency band in which a major portion of the transmitted energy is located.

This object is realized, pursuant to our present invention, by the provision of at least partly capacitive supplemental impedance means, i.e. one or more condensers with or without a resistor or resistors in series and/or in parallel therewith, bridging all or part of the coupling circuit and having a reactance which is negative in a predetermined region of the voice-frequency band, generally a region starting at approximately 600 to 800 Hz, and which attains a maximum absolute value at the upper limit of that region (more particularly around or slightly above 3000 Hz), the combined impedance of the coupling circuit and the additional impedance means being approximately equal to the characteristic impedance of the line.

With the hybrid-coil transformer having a pair of symmetrical windings in series between one line terminal and the balancing network, and with the receiver connected across a further transformer winding while the transmitter lies between the other line terminal and the junction of the two symmetrical windings, the supplemental impedance means includes a condenser shunting at least the winding which is inserted between the first-mentioned terminal and the junction; the impedance means may also extend across the line terminals so as to bridge the series combination of that winding and the transmitter, or may be connected across the two symmetrical windings.

The invention will be described in greater detail with reference to the accompanying drawing in which.

Figure 1A:
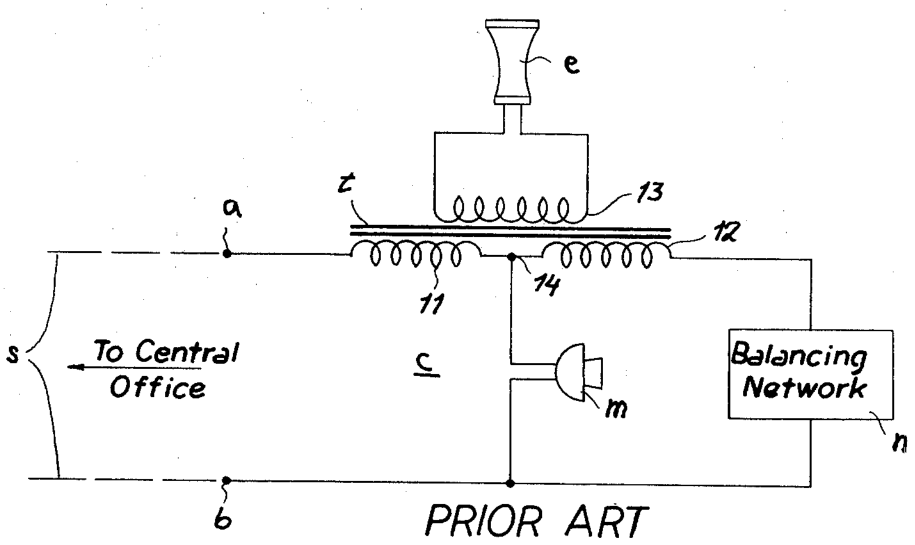
PRIOR ART FIG. 1A
FIG. 1A is a circuit arrangement of a conventional subscriber station conventionally coupled to a two-wire line leading to a central office not further illustrated.
Figure 1B:
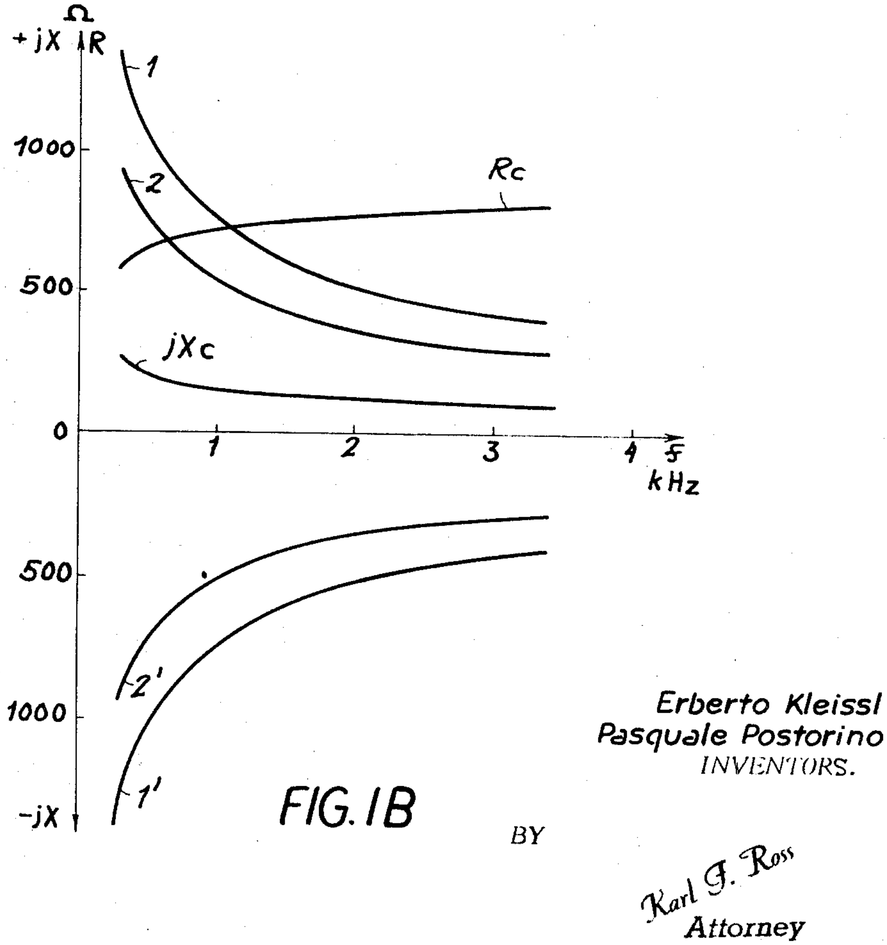
FIG. 1B is a set of graphs relating to the system of FIG. 1A.

FIGS. 2A—10A are circuit arrangements similar to FIG. 1A but showing the coupling circuit supplemented by one or more equalizing impedances according to the invention; and FIGS. 2B—10B are graphs similar to FIG. 1B but relating to the modified circuits of FIGS. 2A—10A, respectively.

In FIG. 1A we have shown a subscriber station of a telephone system comprising an earpiece *e* and a mouthpiece *m* connected, by way of a hybrid-coil transformer *t*, between a balancing network *n* and a two-wire subscriber line *s* leading to a central office not further illustrated. Transformer *t* includes two symmetrical windings 11, 12, inserted between network *n* and a terminal *a* of line *s*, and a further winding 13 connected across the receiver *e*; transmitter *m* lies between the second line terminal *b* and the junction 14 of windings 11 and 12. Transformer *t* forms part of a coupling circuit *c* which connects the receiver *e* and the transmitter *m* in conjugate relationship across the line terminals *a*, *b* as is well understood in the art.

In computing the impedance Z of circuit *c* as seen from the central office, we can neglect the impedance of the balancing network *n* (generally a combination of resistances and capacitances) which, for voice frequencies coming from line *s*, is virtually disconnected from the circuit by the reverse-e.m.f. developed across winding 12 (assuming an ideal transformer) as long as the resistance of microphone *m* is not too high. With this assumption, which is borne out by practical experiments, impedance Z can be expressed as follows:

$$Z=\frac{\omega^2L^2R_e}{R_e^2+\omega^2(L=L_e)^2}+R_m+j\omega L\frac{R_e^2+\omega^2L_t(L+L_e)}{R_e^2+\omega^2(L+L_e)^2}$$
$$\equiv R'_c\pm R_m+jX_c\equiv R_c+jK_c \quad (1)$$

where:

$L_e$ is the inductance of earphone *e*.
$R_e$ is the earphone resistance.
$L$ is the leakage inductance of transformer *t*.
$R_m$ is the resistance of microphone *m*, and
$\omega=2\pi f$ is the pulsatance of the incoming voice-frequency signal.

Impedance Z has a real part $R_c$, which is the sum of the microphone resistance $R_m$ and a component $R_c'$ representing the earphone resistance as seen through transformer *t*, and an imaginary part $jX_c$ which is positive for any finite value of $\omega$. Reactance $jX_c$ equals zero for $\omega=0$ and goes toward infinity for $\omega=\infty$.

Figure 2A:
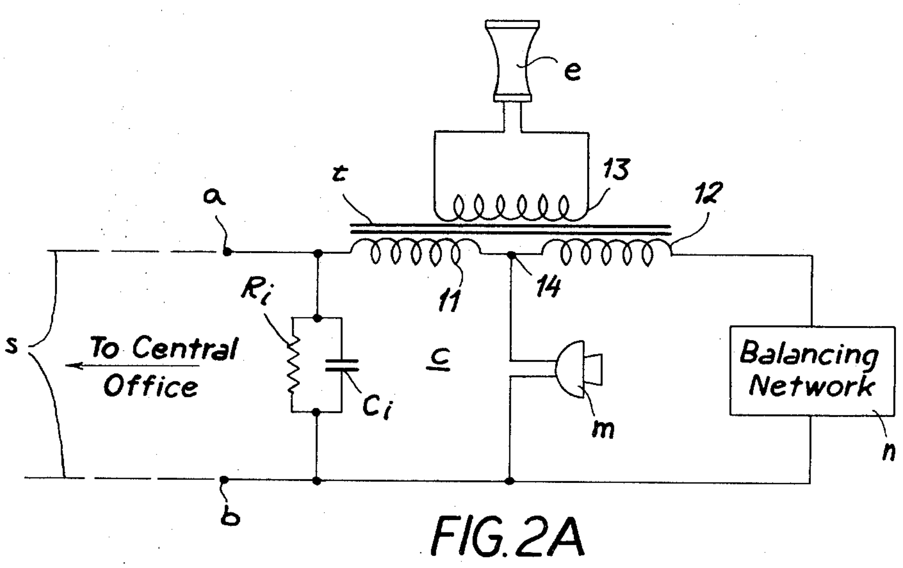

FIG. 1B illustrates the magnitudes of $R_c$ and $jX_c$, over a voice-frequency range between about 300 and 3400 Hz, for a typical telephone circuit of the type shown in FIG. 1A. Curves 1 and 1′ represent the resistive and the reactive component, respectively, of the characteristic impedance of subscriber line *s* in the case of a line whose conductors are No. 26 wires of 0.4 mm diameter; curves 2 and 2′ have the same significance for a line with No. 22 conductors (0.6 mm diameter). The mismatch between the line impedance and the circuit impedance will be readily apparent.

$$G=\frac{R_c}{R_c^2+X_c^2} \quad (2)$$

and $$E=\frac{X_c}{R_c^2+X_c^2} \quad (3)$$

represent the conductance and the susceptance, respectively, of the coupling circuit *c* shown in FIG. 1A. With an equalizing network *i* consisting of a condenser $C_i$ and a parallel resistor $R_i$ connected across terminals *a* and *b*. as illustrated in FIG. 2A, where $$g_i=\frac{1}{R_i} \quad (4)$$

and $$G+g_i\equiv D \quad (5)$$

we can express the admittance $Y_1$ of the modified coupling circuit by $$Y_1=g_i+G+j(\omega C_i-E)\equiv D+j(\omega C_i-E) \quad (6)$$

whence $$Z_1=\frac{1}{D+j(\omega C_i-E)}=\frac{D-(\omega C_i-E)}{D^2+(\omega C_i-E)^2}\equiv R_{c1}+jX_{c1} \quad (7)$$

$Z_1$ being the modified circuit impedance consisting of a real part $R_{c1}$ and an imaginary part $jX_{c1}$ given by $$R_{c1}=\frac{D}{D^2+(\omega C_i-E)^2} \quad (8)$$

and $$X_{c1}=-\frac{\omega C_i-E}{D^2+(\omega C_i-E)^2}\equiv -H \quad (9)$$

respectively. Using the identity $X_{c1}\equiv -H$ of equation (9), we can express the supplemental capacitance $C_i$ by $$C_i=\frac{1+2HE\pm\sqrt{1-4H^2D^2}}{2H\omega} \quad (10)$$

The resistance $R_{c1}$ equals $\frac{1}{D}$ for $\omega = 0$ and goes to zero for $\omega = \infty$, reaching the peak at an intermediate value. The reactance $jX_{c1}$ goes to zero for $\omega = 0$ and $\omega = \frac{E}{C_i}$ and reaches a positive maximum at an intermediate point; after its second zero it remains negative until again disappearing at $\omega = \infty$.

Equation (10) is significant only for $D^2$ ** $\frac{1}{4H^2}$ ; its limiting value, with cancellation of the expression under the square root, occurs at a pulsatance $\omega_1$ when the absolute value of H reaches a maximum H given by $$D=\frac{1}{2\bar{H}} \quad (11)$$

whence, from identity (5) and equation (10), $$g_i=\frac{1}{2\bar{H}}-G \quad (12)$$

and $$C_i=\frac{1+2\bar{H}E}{2\bar{H}\omega_1} \quad (13)$$

Thus, the last two equations give the values of supplemental impedances $R_i$ and $C_i$; according to an important feature of our invention, the critical frequency $\omega_2$ is chosen to lie at or near the upper end of the voice-frequency band to be transmitted, thus in the vicinity of or slightly above f=3kHz in the system here considered. The corresponding curves $R_c$ and $jX_c$ for the modified circuit impedances have been shown in FIG. 2B. It will be noted that the resistive component $R_c$ reaches a maximum of about 640 ohms at a frequency of approximately 680 Hz, this being also the point at which the reactance $jX_c$ passes through zero on going negative, and that from this point onward the resistance $R_c$ lies between the curves 1 and 2 representing the line resistance for the two types of conductors described above. The circuit reactance $jX_c$ also substantially matches the line reactance, represented by curve 1' and 2', at the upper limit of the range where the absolute values of $R_c$ and $jX_c$ are equal; the latter relationship follows from equations (8) and (9) upon substitution therein of the value of $C_i$ given in equation (13).

Figure 2B:
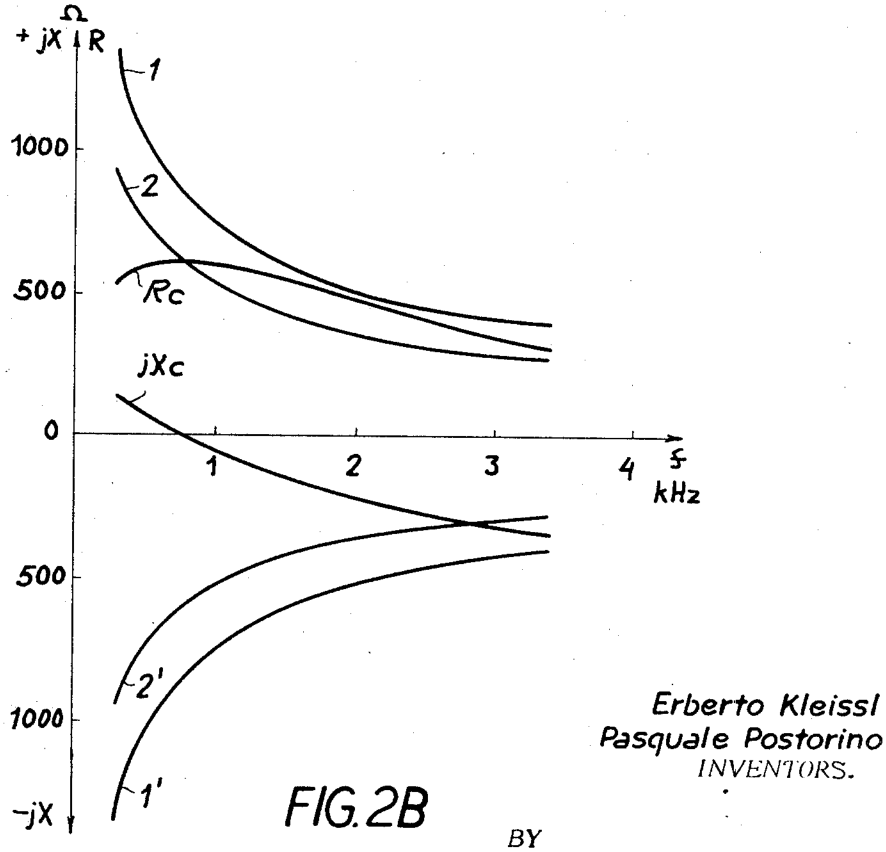
Figure 3A:
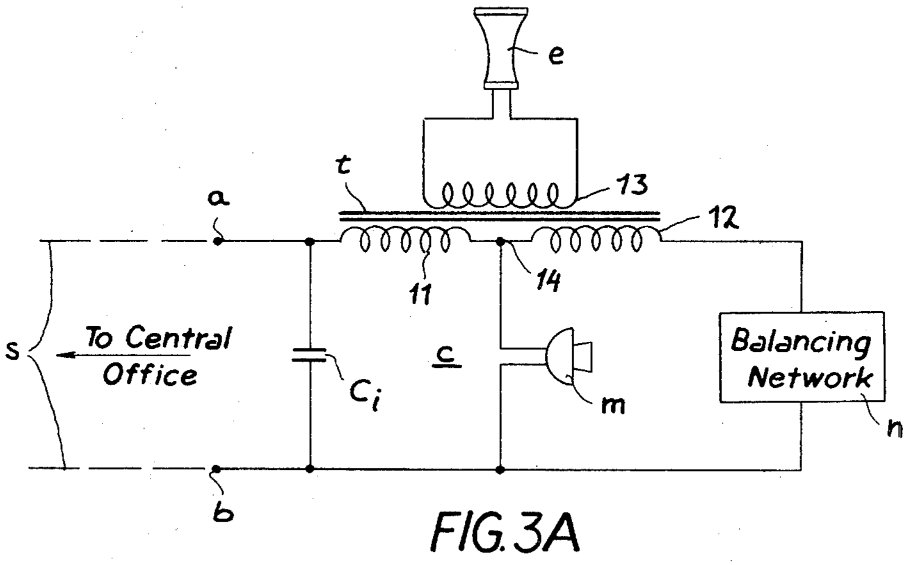
Figure 3B:
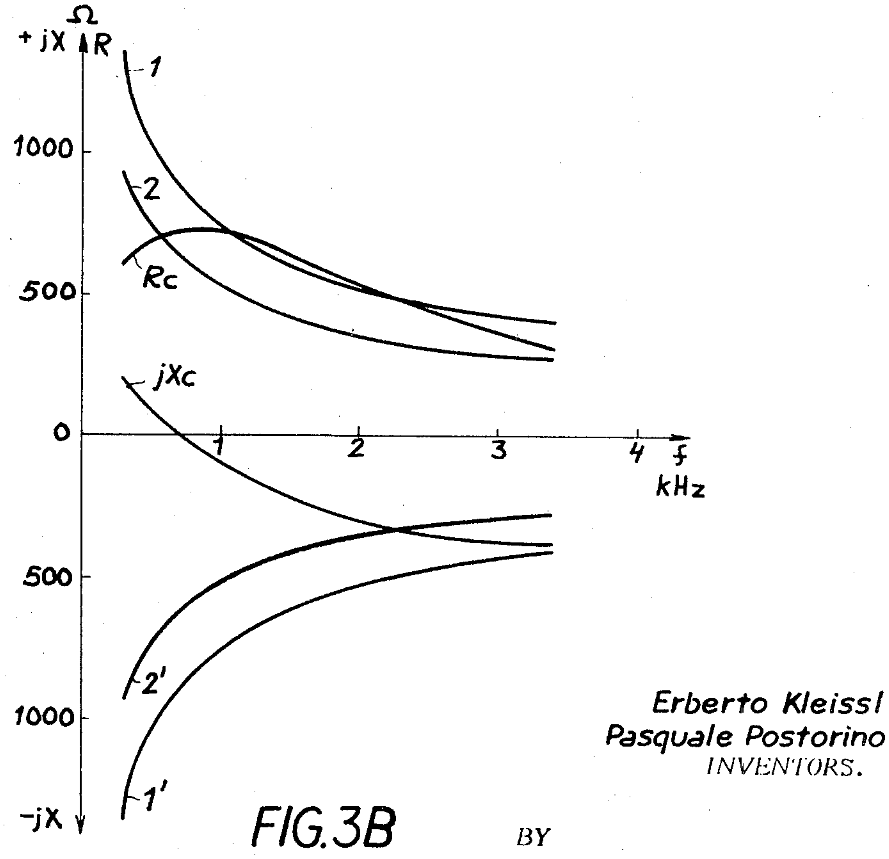

In FIG. 3A we have shown a circuit arrangement similar to that of FIG. 2A wherein, however, the resistor $R_i$ has been omitted, leaving only the supplemental capacitor $C_i$; the corresponding curves $kR_c$ and $jX_c$, shown in FIG. 3B, are similar to those of FIG. 2B, resistance curve $R_c$ intersecting the curve 2 at about 560 Hz whereas reactance $JX_c$ goes negative at approximately 720 Hz.

Figure 4A:
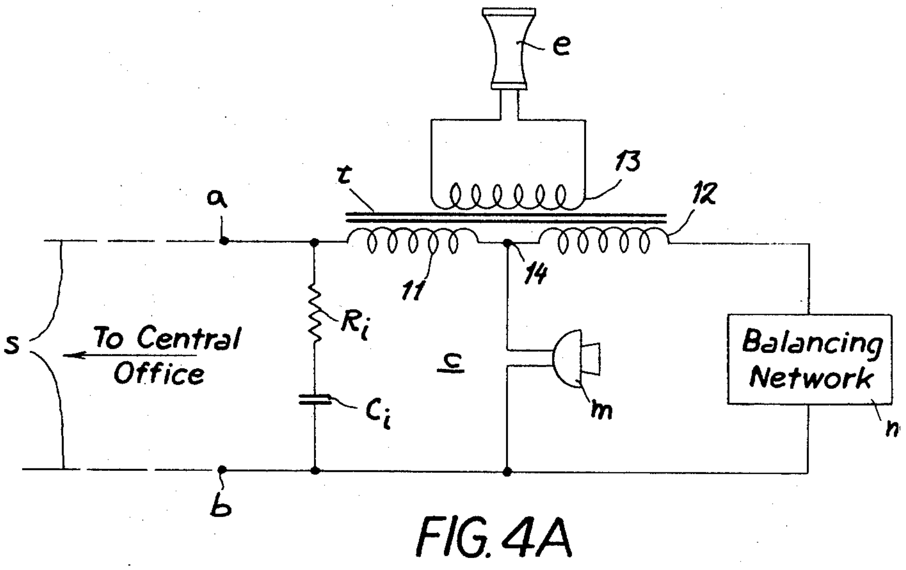
Figure 4B:
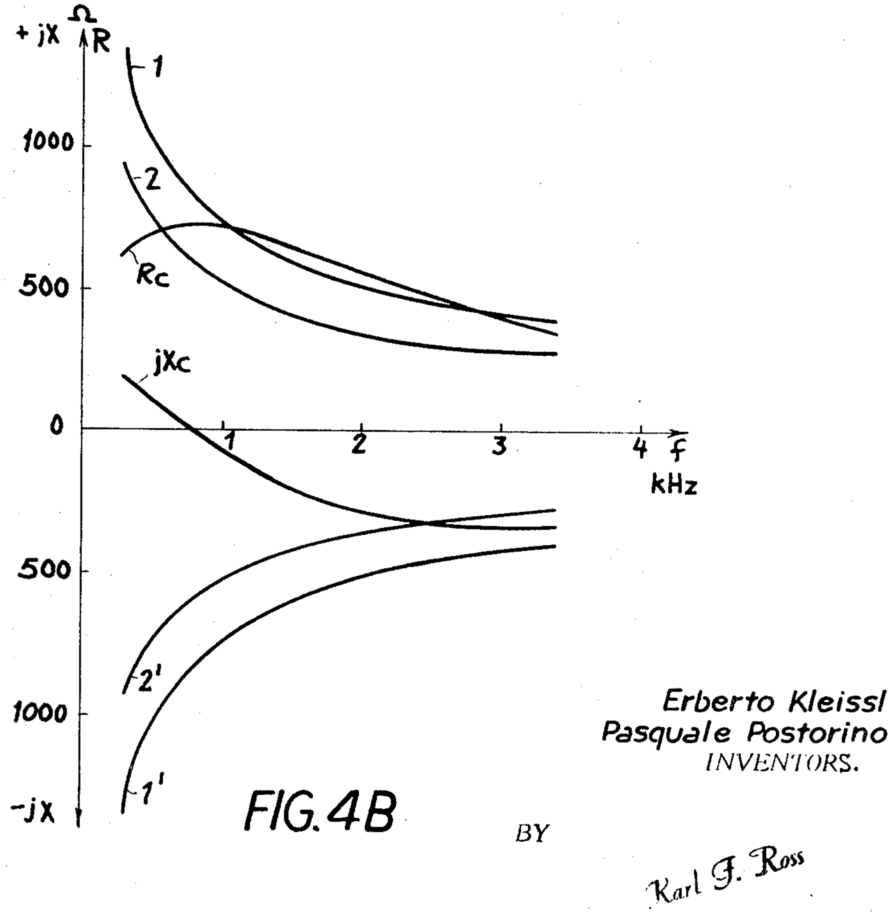

FIG. 4A, the resistor $R_i$ has been connected in series with capacitor $C_i$; curve $R_c$ of corresponding FIG. 4B is similar to that of FIG. 3B whereas the zero point of curve $jX_c$ has been shifted to a frequency of about 800 Hz.

Figure 5A:
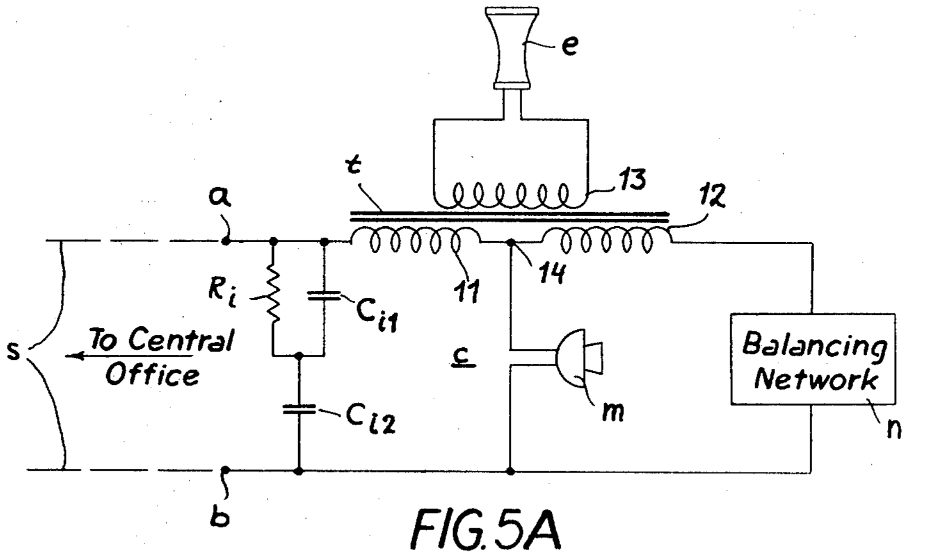
Figure 5B:
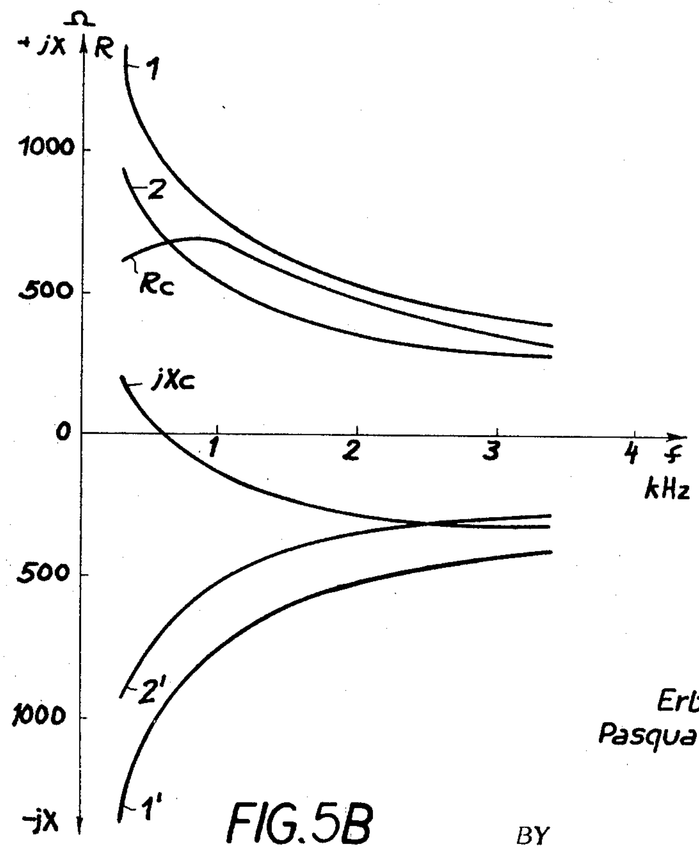

The circuit of FIG. 5A includes a combination of the supplemental impedances of FIGS. 2A and 4A, i.e. a first condenser $C_{i1}$ *shunted by a resistor Ri and a second condenser ci2* in series with the combination of these two impedances. As shown in FIG. 5B, curve $R_c$ lies between curves 1 and 2 over the greater part of the range (as in FIG. 2B) whereas curve $jX_c$ passes through zero around a frequency of 600 Hz.

Figure 6A:
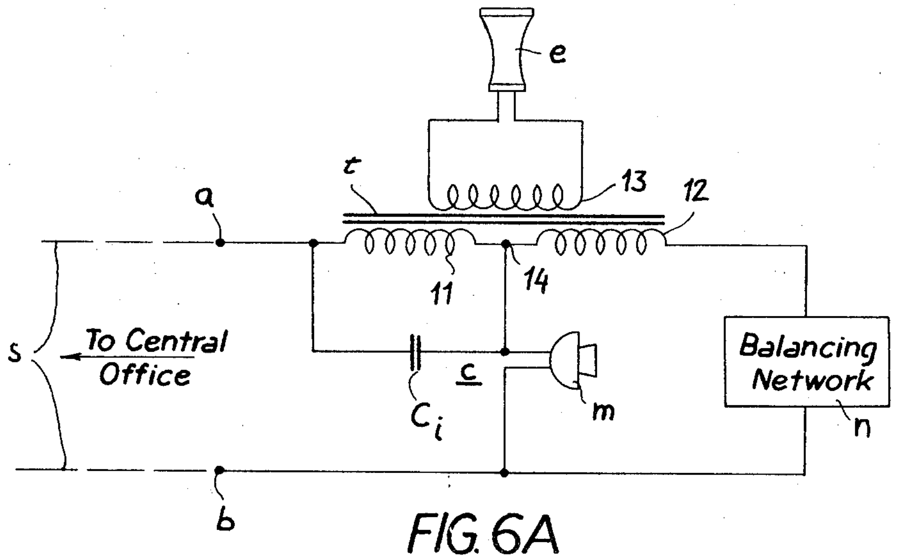

FIG. 6A represents a modification of the previously described circuit in that the supplemental impedance means, reduced to a single condenser $C_r$, is in shunt with only the winding 11 of transformer $t$. Using the notations of equation (1), we can express the conductance and the susceptance of the modified coupling circuit (without capacitor $C_i$ and transmitter $m$) by $$G_1=\frac{R_c'}{R_c'^2+X_c^2} \quad (14)$$

and $$E_1=\frac{X_c}{R_c'^2+X_c^2} \quad (15)$$

whence, with the addition of capacitance $C_i$, the overall circuit impedance $Z_2$ becomes $$Z_2=\frac{G_1-j(\omega C_i-E_1)}{G_1^2+(\omega C_i-E_1)^2}+R_m \quad (16)$$

the real and imaginary components $R_{c2}$ and $jX_{c2}$ are given by the following equations:

$$R_{c2}=\frac{G_1}{G_1^2+(\omega C_i-E_1)^2} \quad (17)$$

$$X_{c2}=-\frac{\omega C_i-E_1}{G_1^2+(\omega C_i-E_1)^2} \quad (18)$$

The resistive component $R_{c2}$ equals $R_m$ for $\omega=0$, then reaches a maximum for $\omega = \frac{E_1}{C_i}$ and again approaches $R_m$ upon $\omega$ tending toward infinity. The reactive component equals zero for $\omega = 0$, then goes positive, again passes through zero for $\omega = \frac{E_i}{C_i}$ and reaches a negative peak at $\omega = \frac{E_i+G_i}{C_i}$, thereafter going to zero a third time at $\omega = \infty$.

Figure 6B:
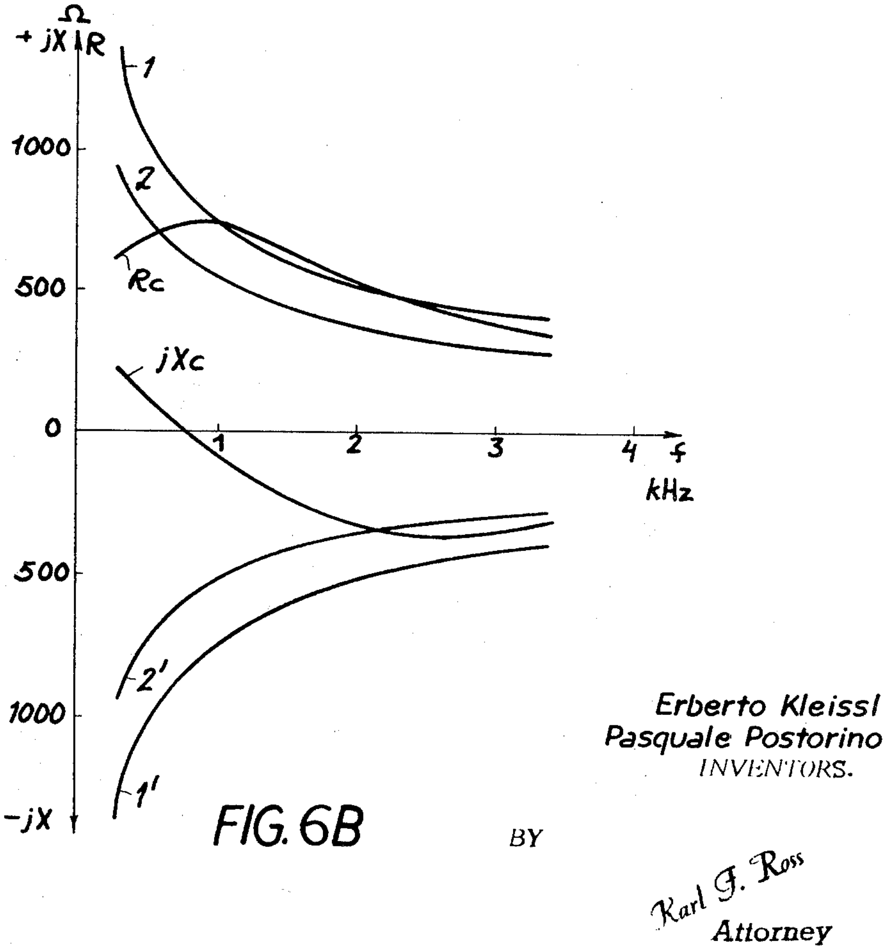

As in the preceding case, we choose a pulsatance $\omega_2$ near the upper limit of the frequency band so that $$\omega_2=\frac{E_1+G_1}{C_i} \quad (19)$$

and $$C_i=\frac{E_1+G_1}{\omega_2} \quad (20)$$

for a value of $\omega_2$ on the order of 3kHz; the corresponding curves $R_c$ and $jX_c$ have been plotted in FIG. 6B and show a resistance peak about 500 Hz as well as a zero reactance at approximately 800 Hz.

Figure 7A:
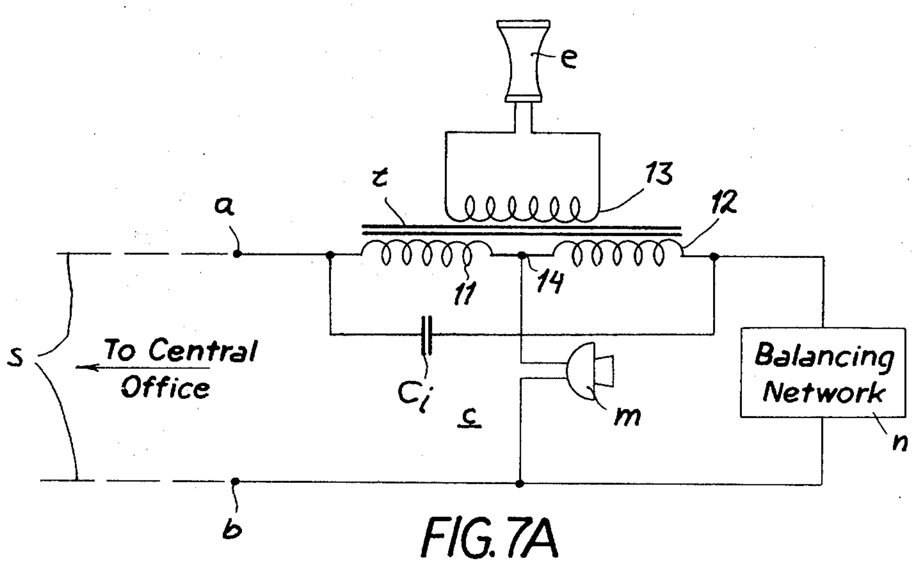
Figure 7B:
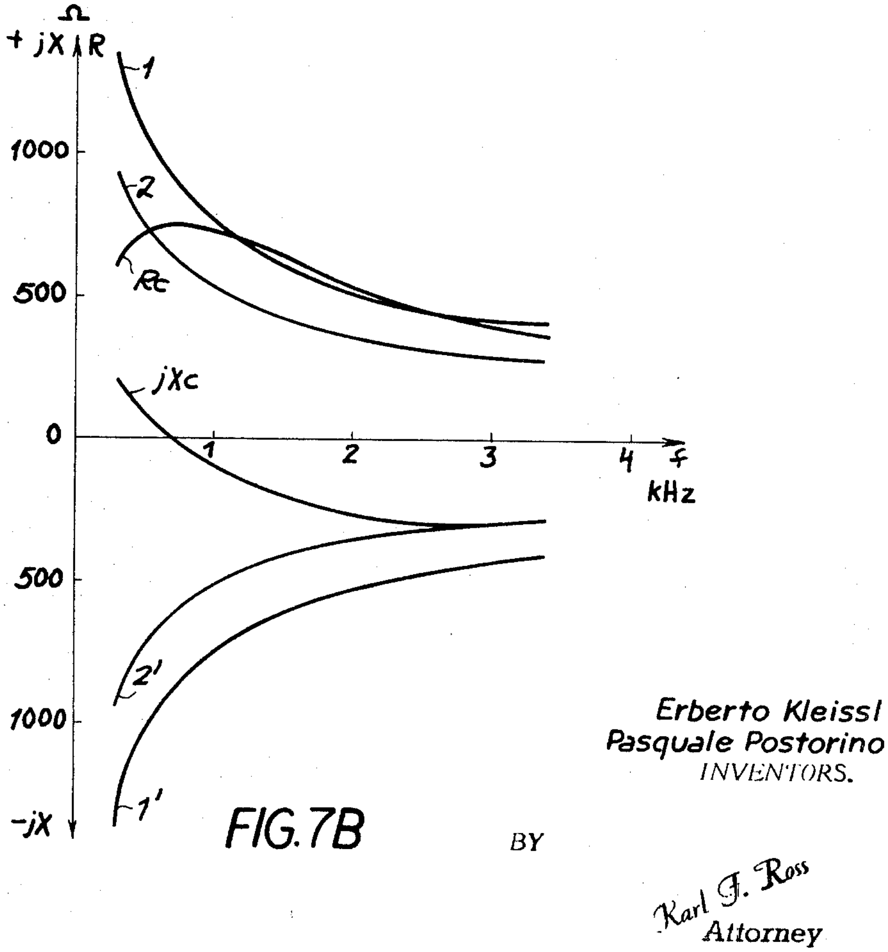

As illustrated in FIG. 7A, condenser $C_i$ may be connected across the two windings 11 and 12 of transformer $t$; as shown in FIG. 7B, the resulting circuit impedances $R_c$ and $jX_c$ are similar to those of the preceding embodiments with reactance $jX_c$ passing through zero at a frequency of about 700 Hz.

Figure 8A:
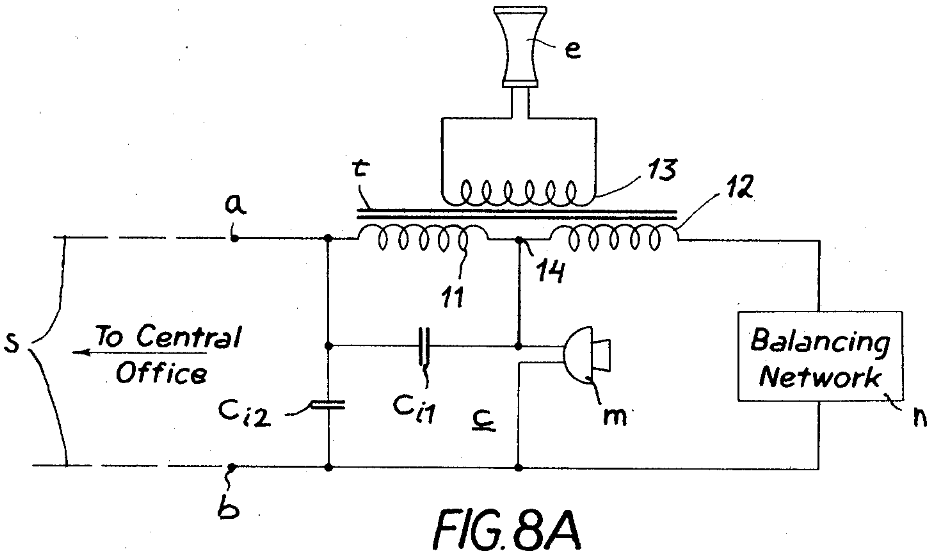
Figure 8B:
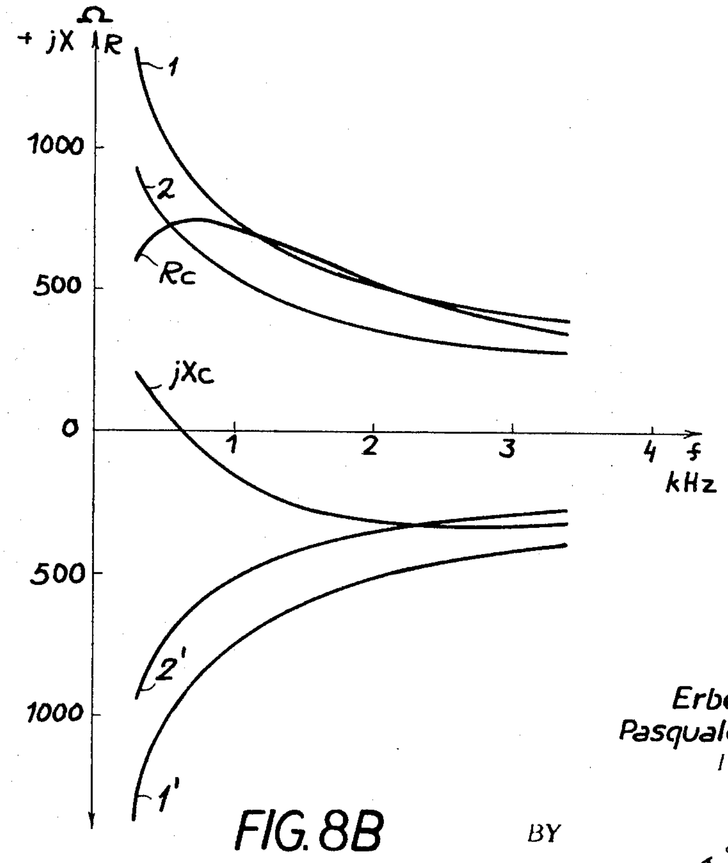

FIG. 8A illustrates a combination of the supplemental capacitances of FIGS. 3A and 6A, i.e. a first condenser $C_{i1}$ in shunt with winding 11 and a second condenser $C_{i2}$ connected across terminals $a$, $b$. The impedance curves of corresponding FIG. 8B are similar to those of FIG. 7B.

Figure 9A:
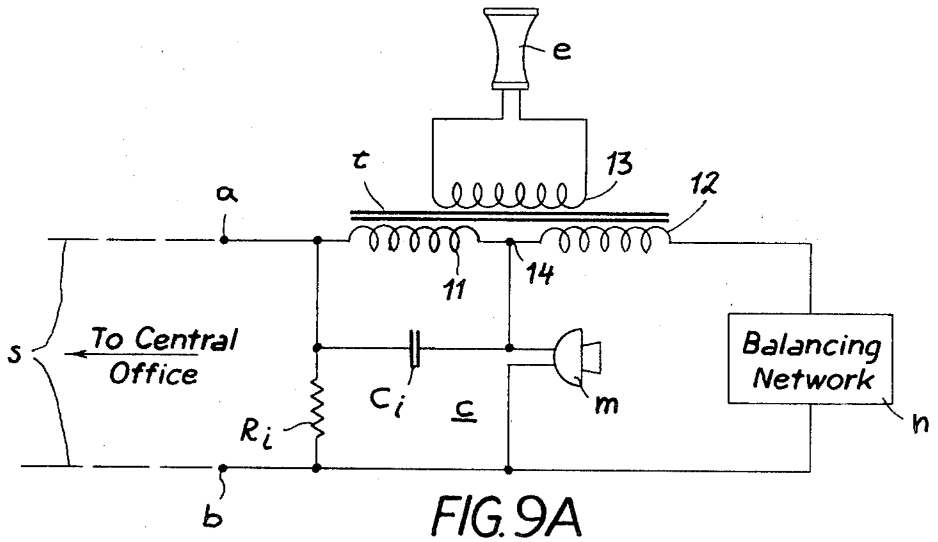
Figure 9B:
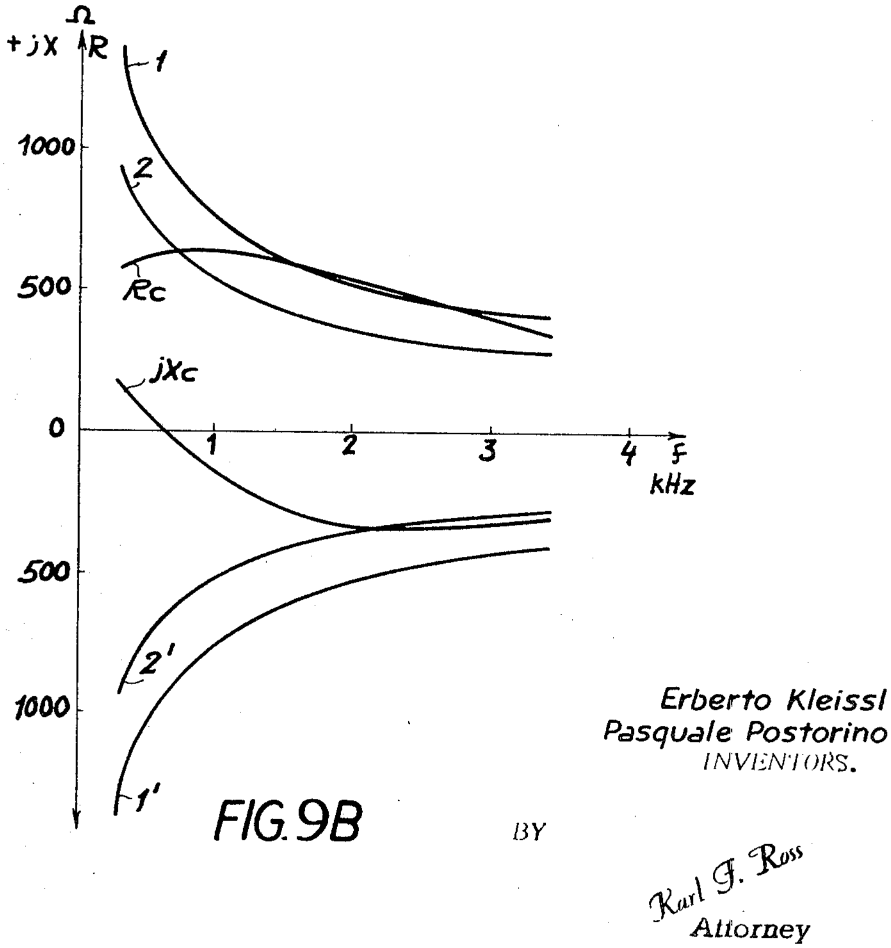

FIG. 9A shows the condenser $C_i$ of FIG. 6A supplemented by a resistor $R_i$ connected across terminals $a$, $b$. The corresponding impedance curves, shown in FIG. 9B, do not differ significantly from those of the preceding two embodiments.

Figure 10A:
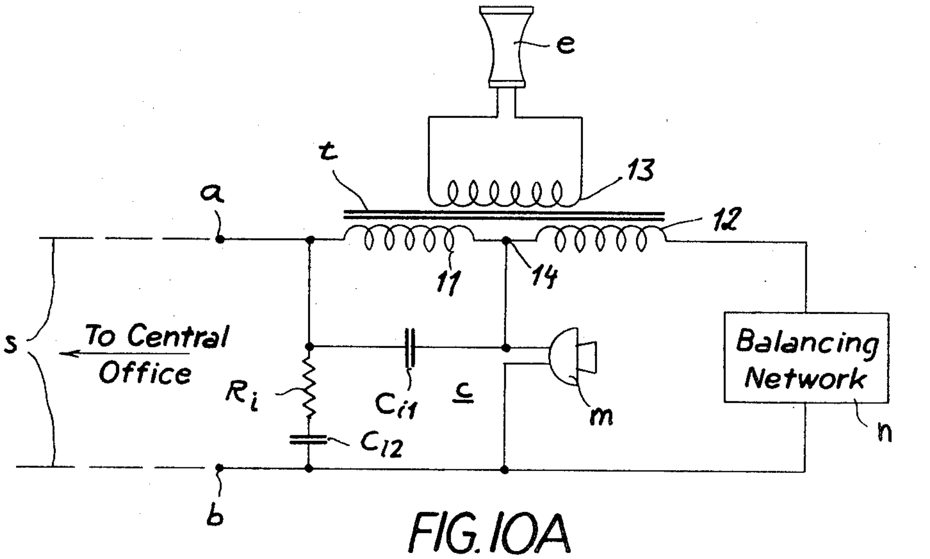
Figure 10B:
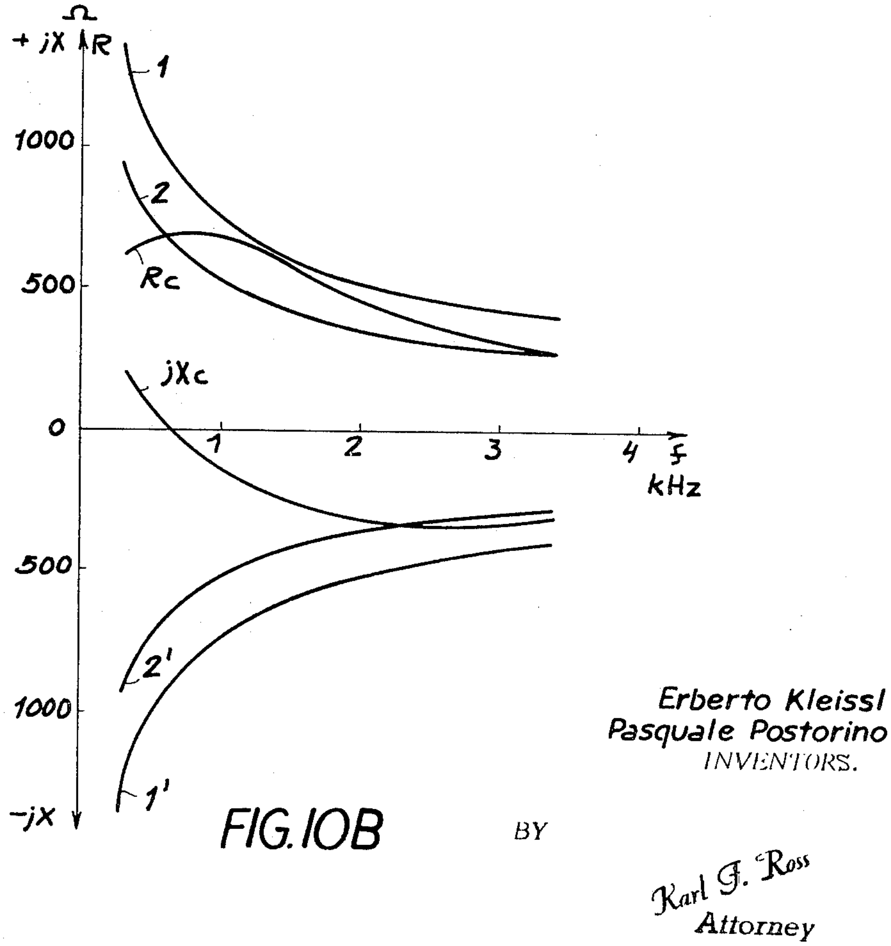

FIG. 10A we have shown a circuit arrangement representing a combination of FIGS. 4A and 6A, with winding 11 shunted by a first condenser $C_{i1}$ and terminals $a$, $b$ spanned by a resistor $R_i$ in series with a second condenser $C_{i2}$. The corresponding resistance $R_c$, FIG. 10B, lies between curves 1 and 2 throughout the frequency band above approximately 550 Hz;

the reactive component $jX_c$ passing through zero at about 600 Hz.

The foregoing examples are merely illustrative of a wide variety of capacitive and resistive/capacitive impedance combinations that may be used in accordance with our present invention to match the impedance of a telephone circuit to that of an associate subscriber line particularly in the upper region of a voice-frequency band to be transmitted.

We claim:

1. In a telephone system comprising a two-wire line leading from a central office to a subscriber station provided with a transmitter and a receiver for a band of voice frequencies, and a coupling circuit including a hybrid coil with several windings connecting said receiver and said transmitter in conjugate relationship between said line and a balancing network, the combination therewith of at least partly capacitive impedance means bridging at least part of said coupling circuit, the reactance of said impedance means being negative in a predetermined region of said voice-frequency band and attaining at the upper limit of said region a maximum absolute value, the combined impedance of said coupling circuit and said impedance means at said upper limit being approximately equal to the characteristic impedance of said line.

2. The combination defined in claim 1 wherein said windings comprise a pair of symmetrical windings lying in series between said balancing network and one terminal of said line, said transmitter being connected between the junction of said symmetrical windings and another terminal of said line, and a further winding connected across said receiver, said part of said coupling circuit including at least one of said symmetrical windings lying between said one terminal and said junction.

3. The combination defined in claim 2 wherein said impedance means is connected across said terminals.

4. The combination defined in claim 2 wherein said impedance means comprises a condenser in parallel with said one of said symmetrical windings.

5. The combination defined in claim 2 wherein said impedance means comprises a condenser bridging both said symmetrical windings.

6. The combination defined in claim 3 wherein said impedance means consists of a single condenser.

7. The combination defined in claim 3 wherein said impedance means consists of a combination of a resistor and at least one condenser.